US008299156B2

(12) United States Patent
Takahashi et al.

(10) Patent No.: US 8,299,156 B2
(45) Date of Patent: *Oct. 30, 2012

(54) PRESSURE-SENSITIVE ADHESIVE SHEET

(75) Inventors: Akiko Takahashi, Ibaraki (JP); Hiroshi Wada, Ibaraki (JP); Tomonari Naito, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/793,863

(22) Filed: Jun. 4, 2010

(65) Prior Publication Data

US 2010/0247833 A1 Sep. 30, 2010

Related U.S. Application Data

(63) Continuation of application No. 12/494,694, filed on Jun. 30, 2009, now Pat. No. 7,758,958, which is a continuation of application No. 11/251,962, filed on Oct. 18, 2005, now Pat. No. 7,867,610.

(30) Foreign Application Priority Data

Oct. 18, 2004 (JP) ................................ 2004-303090

(51) Int. Cl.
*C08L 93/04* (2006.01)
(52) U.S. Cl. .................. 524/272; 524/499; 524/539
(58) Field of Classification Search .............. 524/60, 524/61, 68, 71, 272, 499, 539
See application file for complete search history.

(56) References Cited

U.S. PATENT DOCUMENTS

| 4,199,369 | A | | 4/1980 | Hughes et al. |
| 4,532,273 | A | * | 7/1985 | Kadowaki et al. ............ 523/402 |
| 4,939,190 | A | | 7/1990 | Tomioka et al. |
| 5,284,891 | A | | 2/1994 | Wouters et al. |
| 5,461,103 | A | | 10/1995 | Bafford et al. |
| 2002/0040098 | A1 | | 4/2002 | Maekawa et al. |
| 2003/0017331 | A1 | | 1/2003 | Okochi et al. |
| 2004/0091689 | A1 | | 5/2004 | Tosaki et al. |
| 2006/0057366 | A1 | | 3/2006 | Husemann et al. |

FOREIGN PATENT DOCUMENTS

| EP | 1486548 A1 | 12/2004 |
| JP | 52-77206 A | 6/1977 |
| JP | 56125431 A | 10/1981 |
| JP | 58-004938 B | 1/1983 |
| JP | 05-311137 A | 11/1993 |
| JP | 07-011216 A | 1/1995 |
| JP | 07-133473 A | 5/1995 |
| JP | 08-034962 A | 2/1996 |
| JP | 08-034965 A | 2/1996 |
| JP | 09-025472 A | 1/1997 |
| JP | 09-169966 A | 6/1997 |
| JP | 09145925 A | 6/1997 |
| JP | 09-188864 A | 7/1997 |
| JP | 09-279113 A | 10/1997 |
| JP | 09-286963 A | 11/1997 |
| JP | 10-219221 A | 8/1998 |
| JP | 10-219227 A | 8/1998 |
| JP | 10-245534 A | 9/1998 |
| JP | 11-061087 A | 3/1999 |
| JP | 11-131034 A | 5/1999 |
| JP | 11-335654 A | 12/1999 |
| JP | 2000-265138 A | 9/2000 |
| JP | 2000-273428 A | 10/2000 |
| JP | 2000-309771 A | 11/2000 |
| JP | 2001131514 A | 5/2001 |
| JP | 2002114961 A | 4/2002 |
| JP | 2002-285137 A | 10/2002 |
| JP | 2002-317165 A | 10/2002 |
| JP | 2003-013035 A | 1/2003 |
| JP | 2003-073647 A | 3/2003 |
| JP | 2003-082310 | 3/2003 |
| JP | 2003171560 A | 6/2003 |
| JP | 2003238922 A | 8/2003 |
| JP | 2003-313528 A | 11/2003 |
| JP | 2003-336021 A | 11/2003 |
| JP | 2004-51812 A | 2/2004 |
| JP | 2004-083856 A | 3/2004 |
| JP | 2004-143248 A | 5/2004 |
| JP | 2005-307114 | 11/2005 |
| WO | 00/11099 A2 | 3/2000 |
| WO | 01/14492 A1 | 3/2001 |

OTHER PUBLICATIONS

Submission of Publication dated May 30, 2007.
European Search Report dated Dec. 20, 2005.
Japanese Office Action issued in Application No. 2004-303090; dated Jul. 23, 2010.
Japanese Office Action issued on Jun. 7, 2011 in Japanese Patent Application No. 2004-303090.
Submission of Publication submitted on May 30, 2011 in the corresponding Japanese Patent Application No. 2010-126691.
U.S. Office Action dated Mar. 8, 2011 issued in related U.S. Appl. No. 12/792,841.
U.S. Office action issued on Aug. 31, 2011 in U.S. Appl. No. 12/792,841.
Communication, dated Sep. 30, 2011, issued by the Japanese Patent Office in corresponding Japanese Application No. 2004-303090.
Final U.S. Office Action, issued by the U.S. Patent and Trademark Office in related U.S. Appl. No. 12/792,841 on Dec. 7, 2011.
Communication dated Dec. 29, 2011 from the Taiwanese Intellectual Property Office in Taiwanese application No. 094135644.
Decision of Rejection of Amendment, dated May 29, 2012 issued in the Japanese Patent Office in corresponding Japanese Application No. 2004-303090.

(Continued)

*Primary Examiner* — Peter Szekely
(74) *Attorney, Agent, or Firm* — Sughrue Mion, PLLC

(57) ABSTRACT

A pressure-sensitive adhesive sheet has a high adhesiveness and an excellent terminal peeling resistance as well as exhibits extremely small diffusing amounts of formaldehyde and toluene. The pressure-sensitive adhesive sheet contains at least a pressure-sensitive adhesive layer of a water-dispersion type acrylic pressure-sensitive adhesive containing a water-dispersion type acrylic polymer and a tackifying resin-containing emulsion, wherein a diffusing amount of formaldehyde is less than 3 $\mu g/m^3$ and a diffusing amount of toluene is 10 $\mu g/g$ or less. As the tackifying resin-containing emulsion, a tackifying resin-containing emulsion prepared using substantially no organic solvents or a tackifying resin-containing emulsion prepared using a material other than aromatic hydrocarbon-based organic solvents can be suitably employed.

9 Claims, 1 Drawing Sheet

OTHER PUBLICATIONS

Decision of Refusal dated May 29, 2012 issued by the Japanese Patent Office in corresponding Japanese Application No. 2004-303090.

Japanese Office Action dated May 22, 2012 issued by the Japanese Patent Office in Japanese Patent Application No. 2004-303090.

Japanese Office Action dated May 15, 2012 issued by the Japanese Patent Office in Japanese Patent Application No. 2009-186294.

Office Action dated Jul. 31, 2012, issued by the Japanese Patent Office in counterpart Japanese Application No. 2010-126691.

* cited by examiner

PRESSURE-SENSITIVE ADHESIVE SHEET

This is a continuation of application Ser. No. 12/494,694 filed Jun. 30, 2009, now U.S. Pat. No. 7,758,958, which is a continuation of application Ser. No. 11/251,962 filed Oct. 18, 2005, now U.S. Pat. No. 7,867,610. The entire disclosure of the prior application, application Ser. No. 11/251,962 is considered part of the disclosure of the accompanying continuation application and is hereby incorporated by reference.

FIELD OF THE INVENTION

The present invention relates to a pressure-sensitive adhesive sheet. More specifically, it relates to a pressure-sensitive adhesive sheet (pressure-sensitive adhesive tape, pressure-sensitive adhesive sheet, pressure-sensitive adhesive film, or the like) having a high adhesiveness and an excellent terminal peeling resistance as well as exhibiting extremely small diffusing amounts of formaldehyde and toluene.

BACKGROUND OF THE INVENTION

Water dispersion-type acrylic pressure-sensitive adhesives using water dispersion-type acrylic polymers do not use organic solvents unlike solvent-type acrylic pressure-sensitive adhesives. Therefore, the former pressure-sensitive adhesives have advantages that they are desirable in view of environmental health and are also excellent in view of solvent resistance. In general, in the pressure-sensitive adhesive layers using acrylic pressure-sensitive adhesives, acrylic polymers have low adhesiveness and terminal peeling resistance (a property that a terminal part is hardly peeled off after attached to a substrate to be adhered) and hardly exhibit the properties, so that the adhesiveness and terminal peeling resistance thereof are enhanced by means of emulsions containing tackifying resins. However, emulsions containing tackifying resins sometimes use organic solvents at their production steps for the purpose of lowering solution viscosity and melt viscosity of the tackifying resins [cf. JP-A-2002-285137 (the term "JP-A" as used herein means an "unexamined published Japanese patent application")]. In this regard, in order to produce emulsions containing tackifying resins without using any organic solvent, emulsification should be carried out under high temperature and high pressure. In the case of a resin having a high softening temperature (e.g., a resin having a softening point of 130° C. or higher), the method is very difficult to apply and the kind and amount of an emulsifier to be used are largely limited in many cases. On the other hand, in the case of a resin having a low softening temperature (e.g., a resin having a softening point of less than 130° C.), there is a case that the resin can be emulsified by melting it through heating with using no solvent but in the case of using only the tackifying resin having the low softening temperature, it is considered that a high adhesiveness and excellent terminal peeling resistance and thermal resistance are hardly obtained and the applications of the pressure-sensitive adhesive sheets prepared are limited.

As mentioned above, in order to enhance workability at the time of lowering the solution viscosity and melt viscosity of the tackifying resin having a high softening temperature and satisfy pressure-sensitive adhering properties by broadening flexibility of the kind and amount of the emulsifier to be used, there is a case that the tackifying resin is dissolved or melted using an organic solvent. Usually, the solvent is removed by evaporation under reduced pressure but there is a problem that the above organic solvent remains in a final product although the amount thereof is minute. As such an organic solvent, in view of workability and cost, an aromatic hydrocarbon-based organic solvent such as toluene is generally used. However, since aromatic hydrocarbon-based organic solvents are highly toxic, there is a fear of their influence on environment when pressure-sensitive adhesives and pressure-sensitive adhesive sheets with remaining aromatic hydrocarbon-based organic solvents are used. In particular, there is also a fear of the influence thereof on human bodies in the applications in closed spaces, such as interior materials for automobiles and house building materials.

SUMMARY OF THE INVENTION

Accordingly, an object of the invention is to provide a pressure-sensitive adhesive sheet having a high adhesiveness and an excellent terminal peeling resistance as well as exhibiting extremely small diffusing amounts of formaldehyde and toluene.

As a result of extensive studies for achieving the above object, the present inventors have found that, in a pressure-sensitive adhesive sheet comprising a pressure-sensitive adhesive layer of a water-dispersion type acrylic pressure-sensitive adhesive containing a tackifying resin-containing emulsion, by limiting a diffusing amount of formaldehyde and a diffusing amount of toluene to predetermined values, a high adhesiveness and an excellent terminal peeling resistance can be exhibited even when the pressure-sensitive adhesive sheet has a pressure-sensitive adhesive layer of an acrylic pressure-sensitive adhesive and also diffusing amounts of formaldehyde and toluene can be reduced. The invention is accomplished based on these findings.

Namely, the present invention lies on a pressure-sensitive adhesive sheet comprising at least a pressure-sensitive adhesive layer of a water-dispersion type acrylic pressure-sensitive adhesive containing a water-dispersion type acrylic polymer and a tackifying resin-containing emulsion, wherein a diffusing amount of formaldehyde is less than 3 $\mu g/m^3$ and a diffusing amount of toluene is 10 $\mu g/g$ or less.

In the above pressure-sensitive adhesive sheet, as the tackifying resin-containing emulsion, there may be suitably used a tackifying resin-containing emulsion prepared using substantially no organic solvent and a tackifying resin-containing emulsion prepared using a material other than aromatic hydrocarbon-based organic solvents.

The pressure-sensitive adhesive sheet of the invention can be suitably used at the time when a material for automobiles or a material for residential buildings is to be fixed.

The pressure-sensitive adhesive sheet of the invention has a high adhesiveness and an excellent terminal peeling resistance as well as exhibits extremely small diffusing amounts of formaldehyde and toluene. Therefore, it is suitable as a pressure-sensitive adhesive sheet for use at the time when a material for automobiles or a material for residential buildings is to be fixed.

DESCRIPTION OF THE REFERENCE NUMERALS AND SIGNS

Figure 1A:
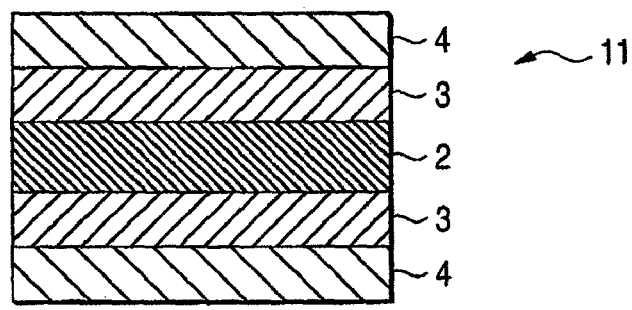
FIGS. 1A to 1F are outline cross-sectional views of the pressure-sensitive adhesive sheets of the invention, respectively.

11 to 16: pressure-sensitive adhesive sheets, respectively
2: substrate 3: tackifying resin-containing pressure-sensitive adhesive layer
4: release liner

DETAILED DESCRIPTION OF THE INVENTION

The following will describe embodiments of the invention in detail with reference to drawings according to needs. Incidentally, the same numerals are assigned to the same members or sites in some cases.

As shown in FIGS. 1A to 1F, the pressure-sensitive adhesive sheet of the invention has a constitution that a pressure-sensitive adhesive layer (sometimes referred to as "tackifying resin-containing pressure-sensitive adhesive layer") of a water-dispersion type acrylic pressure-sensitive adhesive containing a water-dispersion type acrylic polymer and an emulsion containing a tackifying resin (sometimes referred to as "tackifying resin-containing emulsion") is formed on at least one surface of a support and also has properties that a diffusing amount of formaldehyde (formaldehyde-diffusing amount) is less than 3 µg/m$^3$ and a diffusing amount of toluene (toluene-diffusing amount) is 10 µg/g or less. Thus, since the pressure-sensitive adhesive sheet has properties that a formaldehyde-diffusing amount is less than 3 µg/m$^3$ and a toluene-diffusing amount is 10 µg/g or less, diffusing amounts of formaldehyde and toluene are largely reduced although a tackifying resin-containing emulsion is used. Needless to say, since a tackifying resin-containing emulsion is used, a high adhesiveness and an excellent terminal peeling resistance can be secured. Therefore, in the pressure-sensitive adhesive sheet of the invention, the diffusing amounts of formaldehyde and toluene can be effectively reduced with securing a high adhesiveness and an excellent terminal peeling resistance.

In the pressure-sensitive adhesive sheet of the invention, the diffusing amount of formaldehyde is not particularly limited as far as it is less than 3 µg/m$^3$ and the lower the better. The diffusing amount of formaldehyde is suitably 2 µg/m$^3$ or less (particularly, 1 µg/m$^3$ or less). In this regard, as the diffusing amount of formaldehyde, values measured by a method in accordance with JIS A 1901 (2003) are adopted. In this case, the surface area of the sample to be measured is 0.043 m$^2$ and a content (µg/m$^3$) of formaldehyde per unit volume of the sample (pressure-sensitive adhesive sheet) is calculated and determined quantitatively. Specific conditions are as follows.

With Regard to Sampling Conditions
   Trapping tube: "SEP-PAK DNPHSilica cartridge short type" manufactured by Waters
   Flow rate: 167 mL/min
   Collecting amount: 10 L With Regard to Measuring Instruments
   Compact chamber: "20 L chamber" manufactured by ADTEC
   Clean air-feeding apparatus: "ADclean" manufactured by Shin-Ryo Eco Business
   Sealing material, sealing box: None
   Temperature and humidity controlling apparatus: "ADPAC-SYSTEM III temperature-humidity unit" manufactured by ADTEC
   Air-trapping apparatus: "SP208-1000DUAL sampling pump" manufactured by G L Science With Regard to Analytical Conditions
   High performance liquid chromatograph: "TM996PAD" manufactured by Waters
   Detector: UV Detector
   Column: "Puresil C18 (4.6×150 mm)" manufactured by Waters
   Moving phase: acetonitrile aqueous solution (acetonitrile:water=50:50)
   Amount to be injected: 20 µL
   Detection wavelength: 360 nm Moreover, the diffusing amount of toluene is not particularly limited as far as it is 10 µg/g or less and the lower the better. The diffusing amount of toluene is suitably 5 µg/g or less (particularly 3 µg/g or less). In this regard, as the diffusing amount of toluene, values measured by the following "method for measuring toluene-diffusing amount" are adopted.

[Method for Measuring Toluene-Diffusing Amount]

A sample was prepared by cutting the pressure-sensitive adhesive sheet into a predetermined size (area: 5 cm$^2$), the sample is placed in a vial, and the vial is tightly sealed. Thereafter, the vial in which the sample has been placed is heated at 150° C. for 30 minutes by a head space auto-sampler and 1.0 ml of the gas in a heated state is injected into a gas chromatograph measuring apparatus (GC measuring apparatus) to measure the amount of toluene, whereby the content (µg/g) of toluene per a unit weight of the sample (pressure-sensitive adhesive sheet) is calculated and quantitatively determined. In this regard, the measuring conditions for the gas chromatograph are as follows.

(Measuring Conditions for Gas Chromatograph)
   Column: DB-FFAP 1.0 µm (0.535 mmφ×30 m)
   Carrier gas: He 5.0 mL/min
   Column head pressure: 23 kPa (40° C.)
   Injection inlet:split (split ratio 12:1, temperature 250° C.)
   Column temperature: 40° C. (0 min)–<+10° C./min>–250 (9 min) [it means that the temperature is elevated from 40° C. to 250° C. at an elevation rate of 10° C./min and then maintained at 250° C. for 9 minutes]
   Detector: FID (temperature 250° C.)

Incidentally, FIGS. 1A to 1F are outline cross-sectional views of the pressure-sensitive adhesive sheets of the invention, respectively. In FIGS. 1A to 1F, 11 to 16 are pressure-sensitive adhesive sheets, 2 is a substrate, 3 is a tackifying resin-containing pressure-sensitive adhesive layer, and 4 is a release liner. The pressure-sensitive adhesive sheet 11 shown in FIG. 1A has a constitution that the tackifying resin-containing pressure-sensitive adhesive layer 3 is formed on both sides of the substrate 2 as a support and also has a constitution that the tackifying resin-containing pressure-sensitive adhesive layers 3 on both sides are each protected with the release liner 4 only one side of which is a release surface. Moreover, the pressure-sensitive adhesive sheet 12 shown in FIG. 1B has a constitution that the tackifying resin-containing pressure-sensitive adhesive layer 3 is formed on both sides of the substrate 2 as a support and also has a constitution that the tackifying resin-containing pressure-sensitive adhesive layer 3 on any one side is protected with the release liner 4 both sides of which are release surfaces as well as it may have a constitution that the tackifying resin-containing pressure-sensitive adhesive layer 3 on the other side may be protected with the other release surface of the above release liner 4 by winding the pressure-sensitive adhesive sheet 12 in a roll form.

Figure 1B:
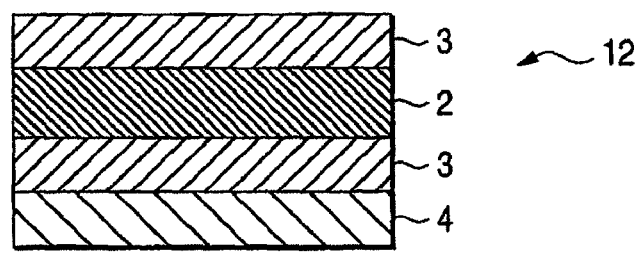
Figure 1C:
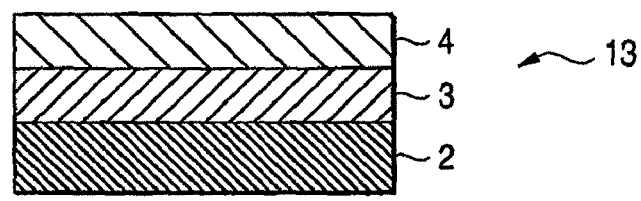

Moreover, the pressure-sensitive adhesive sheet 13 shown in FIG. 1C has a constitution that the tackifying resin-containing pressure-sensitive adhesive layer 3 is formed on one side of the substrate 2 as a support and also has a constitution that the tackifying resin-containing pressure-sensitive adhesive layer 3 is protected with the release liner 4 only one side of which is a release surface. The pressure-sensitive adhesive sheet 14 shown in FIG. 1D has a constitution that the tackifying resin-containing pressure-sensitive adhesive layer 3 is formed on one side of the substrate 2 as a support and also the backside of the substrate 2 as a support is a release surface as well as it may have a constitution that the tackifying resin-containing pressure-sensitive adhesive layer 3 may be protected with the release surface formed on the backside of the substrate 2 by winding the pressure-sensitive adhesive sheet 14 in a roll form.

Figure 1D:
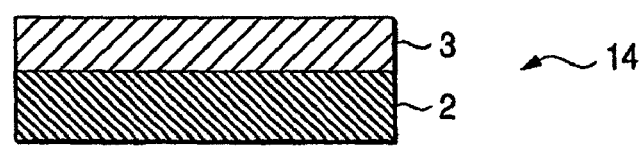
Figure 1E:
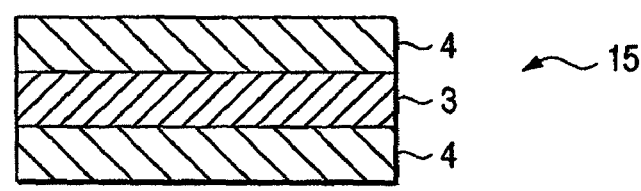

Furthermore, the pressure-sensitive adhesive sheet 15 shown in FIG. 1E has a constitution that the tackifying resin-containing pressure-sensitive adhesive layer 3 is formed on one side of the release liner 4 (release surface side of a release liner only one side of which is a release surface) as a support and also has a constitution that the tackifying resin-containing pressure-sensitive adhesive layer 3 is protected with the release liner 4 only one side of which is a release surface. The pressure-sensitive adhesive sheet 16 shown in FIG. 1F has a constitution that the tackifying resin-containing pressure-sensitive adhesive layer 3 is formed on one side of the release liner 4 (a release liner both sides of which are release surfaces) as a support and also may have a constitution that the tackifying resin-containing pressure-sensitive adhesive layer 3 may be protected with the other release surface of the release liner 4 as the support by winding the pressure-sensitive adhesive sheet 16 in a roll form.

As mentioned above, it is sufficient that the pressure-sensitive adhesive sheet of the invention has at least a tackifying resin-containing pressure-sensitive adhesive layer. For example, the sheet may be any of a pressure-sensitive adhesive sheet having a substrate (substrate-attached pressure-sensitive adhesive sheet) or a pressure-sensitive adhesive sheet having no substrate (substrate-less pressure-sensitive adhesive sheet). Moreover, the pressure-sensitive adhesive sheet may be any of a double-sided pressure-sensitive adhesive sheet wherein both sides are pressure-sensitive adhesive surface and a one-sided pressure-sensitive adhesive sheet wherein only one side is a pressure-sensitive adhesive surface. In this regard, in the case that the pressure-sensitive adhesive sheet is a substrate-less pressure-sensitive adhesive sheet, a support capable of exhibiting a peeling ability toward the tackifying resin-containing pressure-sensitive adhesive layer (e.g., release liner) may be employed as a support.

Moreover, the pressure-sensitive adhesive sheet of the invention is adjusted so that the diffusing amounts of formaldehyde and toluene become predetermined values. Therefore, it is important to use materials having small contents (or remaining amounts) of formaldehyde and toluene as materials constituting the pressure-sensitive adhesive sheet (e.g., materials constituting the tackifying resin-containing pressure-sensitive adhesive layer and substrate). Since the pressure-sensitive adhesive sheet has at least a tackifying resin-containing pressure-sensitive adhesive layer, it is preferable to use materials having small contents of formaldehyde and toluene as materials constituting the tackifying resin-containing pressure-sensitive adhesive layer.

[Tackifying Resin-Containing Pressure-Sensitive Adhesive Layer]

As mentioned above, since the tackifying resin-containing pressure-sensitive adhesive layer is made of a water-dispersion type acrylic pressure-sensitive adhesive containing a water-dispersion type acrylic polymer and an emulsion containing a tackifying resin (tackifying resin-containing emulsion), formaldehyde and toluene are mainly contained in the tackifying resin-containing emulsion in some cases.

(Tackifying Resin-Containing Emulsion)

In the tackifying resin-containing pressure-sensitive adhesive layer, the tackifying resin-containing emulsion is a tackifying resin composition in an emulsion form wherein a tackifying resin is dispersed in water. The tackifying resin is not particularly limited and examples thereof include rosin-based tackifying resins, terpene-based tackifying resins, hydrocarbon-based tackifying resins, epoxy-based tackifying resins, polyamide-based tackifying resins, elastomer-based tackifying resins, phenol-based tackifying resins, ketone-based tackifying resins, and the like. The tackifying resin can be used solely or in combination of two or more thereof.

Specifically, examples of the rosin-based tackifying resins include unmodified rosins (raw rosins) such as gum rosins, wood rosins, and tall oil rosins, modified rosins modified by hydrogenation, disproportionation, polymerization, or the like of the unmodified rosins (hydrogenated rosins, disproportionated rosins, polymerized rosins, and other chemically modified rosins) as well as various rosin derivatives and the like. Examples of the above rosin derivatives include rosin esters such as ester compounds of rosins obtained by esterifying unmodified rosins with alcohols and ester compounds of modified rosins obtained by esterifying modified rosins including hydrogenated rosins, disproportionated rosins, polymerized rosins, and the like with alcohols; unsaturated fatty acid-modified rosins obtained by modifying unmodified rosins or modified rosins (hydrogenated rosins, disproportionated rosins, polymerized rosins, and the like) with unsaturated fatty acids; unsaturated fatty acid-modified rosin esters obtained by modifying rosin esters with unsaturated fatty acids; rosin alcohols obtained by reducing the carboxyl group in unmodified rosins, modified rosins (hydrogenated rosins, disproportionated rosins, polymerized rosins, and the like), unsaturated fatty acid-modified rosins, or unsaturated fatty acid-modified rosin esters; metal salts of rosins (in particular, rosin esters) including unmodified rosins, modified rosins, and various rosin derivatives; and the like. In addition, there can be used rosin phenol resins obtained by adding phenol to rosins (unmodified rosins, modified rosins, and various rosin derivatives, and the like) in the presence of an acid catalyst, followed by thermal polymerization.

Examples of the terpene-based tackifying resins include terpene-based resins such as α-pinene polymer, β-pinene polymers, and diterpene polymers, modified terpene-based resins obtained by subjecting these terpene-based resins to modification (phenol-modification, aromatic modification, hydrogenation-modification, hydrocarbon-modification, or the like), e.g., terpene-phenol-based resins, styrene-modified terpene-based resins, aromatic modified terpene-based resins, hydrogenated terpene-based resins, etc., and the like.

Examples of the hydrocarbon-based tackifying resins include various hydrocarbon-based resins such as aliphatic hydrocarbon resins [polymers of aliphatic hydrocarbons, e.g., olefins and dienes having 4 to 5 carbon atoms (olefins such as butene-1, isobutylene, pentene-1; dienes such as butadiene, 1,3-pentadiene, and isoprene)], aromatic hydrocarbon resins [polymers of vinyl group-containing aromatic hydrocarbons having 8 to 10 carbon atoms (styrene, vinyltoluene, α-methylstyrene, indene, methylindene, etc.)], aliphatic cyclic hydrocarbon resins [alicyclic hydrocarbon resins obtained by cyclizing and dimerizing so-called "C4 petroleum fraction" or "C5 petroleum fraction" and subsequently polymerizing the product, polymers of cyclic diene compounds (cyclopentadiene, dicyclopentadiene, ethylidenenorbornene, dipentene, etc.) or hydrogenation products thereof, alicyclic hydrocarbon resins obtained by hydrogenating aromatic ring of the following aromatic hydrocarbon resins or aliphatic and aromatic petroleum resins, and the like], aliphatic and aromatic petroleum resins (styrene-olefin copolymers and the like), aliphatic and alicyclic petroleum resins, hydrogenated hydrocarbon resins, coumarone-based resins, and coumarone-indene based resins.

As the tackifying resins, in order to reduce the diffusing amounts of formaldehyde and toluene in the pressure-sensitive adhesive sheets and also exhibit a high adhesiveness and excellent terminal peeling resistance and thermal resistance, a tackifying resin having a softening point (softening temperature) of 120° C. or higher (preferably 130° C. or higher, more preferably 140° C. or higher) is suitable. In this regard, the upper limit of the softening point of the tackifying resin is not particularly limited and may be, for example, 170° C. or lower (preferably 160° C. or lower, more preferably 155° C. or lower).

Incidentally, the softening point of the tackifying resin is defined as a value measured by the ring and ball method specified in JIS K 5902. Concretely, a sample is promptly melted at a temperature as low as possible and the resulting melt is poured into a ring placed on a flat metal plate to fill the ring with care so as not to form bubbles. After cooling, the portion protruded from the plane containing top edge of the ring is cut off with a knife heated a little. Thereafter, a support is placed in a glass vessel (diameter 85 mm or more, height 127 mm or more) and water cooled after pre-boiling is poured into the vessel to a depth of 90 mm or more. Then, a steel ball (diameter 9.5 mm, weight 3.5 g) and the ring filled with the sample are immersed in water so that they do not come into contact with each other and the temperature of the water is maintained at 20° C.±5° C. for 15 minutes. Then, the steel ball is placed on the central part of the surface of the sample in the ring and it is placed at a fixed position on the support. Thereafter, the distance from the top edge of the ring to the water surface is maintained at 50 mm, a thermometer is placed, the central position of the mercury ball of the thermometer is kept at the same height of the central part of the ring, and the vessel is heated. The flame of Bunsen burner used for heating is regulated so that the flame touches middle parts between the center and the edges of the bottom of the vessel to even the heating. The elevation rate of the water temperature when the temperature has reached 40° C. after the beginning of the heating should be 5.0±0.5° C. per minute. A temperature is read at the time when the sample is gradually softened, runs off the ring, and finally comes into contact with the bottom plate, the temperature being regarded as a softening point. The measurement of the softening point is carried out using two or more sets simultaneously and an average value thereof is adopted.

In particular, as the tackifying resin, a tackifying resin using no formaldehyde as a material (or a raw material) at the production of the tackifying resin may be suitably used. In the tackifying resin, examples of the tackifying resin using no formaldehyde as a material or a raw material include rosin-based tackifying resins, terpene-based tackifying resins, hydrocarbon-based tackifying resins, epoxy-based tackifying resins, polyamide-based tackifying resins, elastomer-based tackifying resins, and the like. Thus, by using the tackifying resin using no formaldehyde as a material (or a raw material) as a tackifying resin, the diffusing amount (content) of formaldehyde in the pressure-sensitive adhesive sheet having a tackifying resin-containing pressure-sensitive adhesive layer can be controlled to less than 3 $\mu g/m^3$.

The tackifying resin-containing emulsion can be prepared by dispersing a tackifying resin into water. On this occasion, the tackifying resin-containing emulsion is usually prepared by dissolving or melting the tackifying resin and then dispersing it into water. In the case that the tackifying resin is a tackifying resin having a low softening point, the tackifying resin-containing emulsion can be prepared by melting the tackifying resin upon heating and then dispersing it into water. On the other hand, in the case that the tackifying resin is a tackifying resin having a high softening point, the tackifying resin-containing emulsion is preferably prepared by dissolving or melting the tackifying resin utilizing a method of dissolving or melting the tackifying resin, such as a method of melting the tackifying resin under high temperature and high pressure using substantially no organic solvent or a method of dissolving the resin using a material other than aromatic hydrocarbon-based organic solvents, and then dispersing the resin into water. Thus, by utilizing the method of dissolving or melting the tackifying resin as mentioned above at the dissolution or melting of the tackifying resin, the diffusing amount (content) of formaldehyde and the diffusing amount (content) of toluene in the pressure-sensitive adhesive sheet having a tackifying resin-containing adhesive layer can be controlled to less than 3 $\mu g/m^3$ and 10 $\mu g/g$ or less, respectively.

Incidentally, as methods for emulsifying the tackifying resin using substantially no organic solvent, there may be mentioned a non-solvent-system high-pressure emulsifying method, a non-solvent-system phase-conversion emulsifying method, and the like. The non-solvent-system high-pressure emulsifying method is a method wherein a tackifying resin is heated to the softening point or higher, it is pre-mixed in a melted state with water and an appropriate emulsifier, and then they are emulsified in a high-pressure emulsifying machine to obtain an emulsion. Moreover, the non-solvent-system phase-conversion emulsifying method is a method wherein the tackifying resin is heated to the softening point or higher to knead an emulsifier therein under elevated pressure or under normal pressure, hot water is gradually added, and emulsification with phase-conversion is effected to obtain an emulsion.

Furthermore, in the method of dissolving or melting the tackifying resin using a material other than aromatic hydrocarbon-based organic solvents, the material other than aromatic hydrocarbon-based organic solvents may be suitably selected according to the kind of the tackifying resin, and alicyclic hydrocarbon-based organic solvents can be suitably employed. Examples of such alicyclic hydrocarbon-based organic solvents include cyclohexanes (cyclohexane and alkyl group-containing cyclohexanes such as methylcyclohexane, ethylcyclohexane, dimethylcyclohexane, and methylethylcyclohexane) and also cyclopentanes (cyclopentane and alkyl group-containing cyclopentanes), cycloheptanes (cycloheptane and alkyl group-containing cycloheptanes), and cyclooctanes (cyclooctane and alkyl group-containing cyclooctanes) corresponding to the cyclohexanes. The organic solvents such as alicyclic hydrocarbon-based organic solvent may be used solely or as a mixture of two or more thereof.

The amount of the organic solvent such as alicyclic hydrocarbon-based organic solvent to be used is not particularly limited and may be an amount capable of dissolving or melting the tackifying resin and dispersing it in water using an emulsifier according to needs but it is preferred to reduce the amount to the minimum as far as possible. Incidentally, after the tackifying resin-containing emulsion is once prepared, it is important to remove the organic solvent as far as possible by a known or conventional removing method (e.g., a method of removal by evaporation under reduced pressure).

In the invention, an emulsifier can be employed at the dispersion of the tackifying resin in water in the preparation of the tackifying resin-containing emulsion. As the emulsifier, one or more emulsifiers can be used, which are suitably selected from the following emulsifiers exemplified as emulsifiers to be used at the preparation of the above water-dispersion type acrylic polymer. Specifically, as the emulsifiers, any forms of emulsifiers may be used but anionic emulsifiers and nonionic emulsifiers can be suitably used. Examples of the anionic emulsifiers include alkyl sulfate salt-type anionic emulsifiers such as sodium lauryl sulfate, ammonium lauryl sulfate, and potassium lauryl sulfate; polyoxyethylene alkyl ether sulfate salt-type anionic emulsifiers such as sodium polyoxyethylene lauryl ether sulfate; polyoxyethylene alkylphenyl ether sulfate salt-type anionic emulsifiers such as ammonium polyoxyethylene laurylphenyl ether sulfate, and sodium polyoxyethylene laurylphenyl ether sulfate; sulfonate salt-type anionic emulsifiers such as sodium dodecylbenzenesulfonate; sulfosuccinate-type anionic emulsifiers such as disodium lauryl sulfosuccinate and disodium lauryl polyoxyethylenesulfosuccinate; and the like. In addition, examples of the nonionic emulsifiers include polyoxyethylene alkyl ether-type nonionic emulsifiers such as polyoxyethylene lauryl ether; polyoxyethylene alkylphenyl ether-type nonionic emulsifiers such as polyoxyethylene laurylphenyl ether; nonionic emulsifiers such as polyoxyethylene fatty acid esters, polyoxyethylene-polyoxypropylene block polymers; and the like.

The emulsifier at the preparation of the water-dispersion type acrylic polymer and the emulsifier at the preparation of the tackifying resin-containing emulsion may be the same or different from each other. However, when one of the emulsifiers is an anionic emulsifier, it is preferable to use an anionic emulsifier as another one, too. Moreover, when one of the emulsifiers is a nonionic emulsifier, it is preferable to use a nonionic emulsifier as another one, too.

The amount of the emulsifier to be used is not particularly limited as far as it is an amount capable of preparing the tackifying resin in an emulsion form. For example, the amount can be selected from the range of 0.2 to 10% by weight, preferably from 0.5 to 5% by weight based on the total amount of the tackifying resin (solid matter).

As the tackifying resin-containing emulsion, there may be, for example, used a trade name "SK-253NS" (manufactured by Harima Chemicals, Inc.; softening point 145° C.; a tackifying resin-containing emulsion produced using substantially no organic solvent), a trade name "Tamanor E-200-NT" (manufactured by Arakawa Chemical Industries, Ltd.; softening point 150° C.; a tackifying resin-containing an emulsion produced using an alicyclic hydrocarbon-based organic solvent), and the like.

(Water-Dispersion Type Acrylic Polymer)

In the tackifying resin-containing pressure-sensitive adhesive layer, the water-dispersion type acrylic polymer is an acrylic polymer composition in an emulsion form wherein an acrylic polymer is dispersed in water. The acrylic polymer is used as a base polymer of the pressure-sensitive adhesive (elemental component of the pressure-sensitive adhesive). In the acrylic polymer, as a main constituting monomer component (main component of monomer), an alkyl (meth)acrylate (alkyl acrylate or alkyl methacrylate) is used. As the alkyl (meth)acrylate, an acrylic compound represented by the following formula (1):

wherein $R^1$ represents a hydrogen atom or a methyl group and $R^2$ represents an alkyl group, can be suitably used.

In the above formula (I), $R^1$ is a hydrogen atom or a methyl group and $R^2$ is an alkyl group. Specifically, examples of the alkyl group for $R^2$ include alkyl groups having 1 to 20 carbon atoms, such as a methyl group, an ethyl group, an propyl group, an isopropyl group, a butyl group, an isobutyl group, an s-butyl group, a t-butyl group, a pentyl group, an isoamyl group, a neopentyl group, a hexyl group, a heptyl group, an octyl group, an isooctyl group, as 2-ethylhexyl group, a nonyl group, an isononyl group, a decyl group, an isodecyl group, an undecyl group, a dodecyl group, a tridecyl group, a tetradecyl group, a pentadecyl group, a hexadecyl group, a heptadecyl group, an octadecyl group, a nonadecyl group, and an eicosyl group. As the alkyl group for $R^2$, an alkyl group having 2 to 14 carbon atoms is preferable and furthermore, an alkyl group having 2 to 10 carbon atoms, particularly a butyl group or a 2-ethylhexyl group, is suitable.

Specifically, examples of the alkyl (meth)acrylate include butyl (meth)acrylate, isobutyl (meth)acrylate, s-butyl (meth)acrylate, t-butyl (meth)-acrylate, pentyl (meth)acrylate, isoamyl (meth)acrylate, hexyl (meth)acrylate, heptyl (meth)acrylate, 2-ethylhexyl (meth)acrylate, octyl (meth)acrylate, isooctyl (meth)-acrylate, nonyl (meth)acrylate, isononyl (meth)acrylate, decyl (meth)acrylate, isodecyl (meth)acrylate, undecyl (meth)acrylate, dodecyl (meth)acrylate, and the like.

The alkyl (meth)acrylate may be used solely or in combination of two or more thereof. As the alkyl (meth)acrylate, for example, butyl acrylate may be used solely or butyl acrylate and 2-ethylhexyl acrylate may be used in combination. In this regard, as the alkyl (meth)acrylate, in the case that butyl acrylate and 2-ethylhexyl acrylate are used in combination, the ratio of butyl acrylate to 2-ethylhexyl acrylate is not particularly limited but, for example, the ratio can be selected from the range of 2-ethylhexyl acrylate/butyl acrylate (weight ratio)=about 0/100 to 55/45, preferably about 5/95 to 60/40.

As the monomer component constituting the acrylic polymer, as far as an alkyl (meth)acrylate is used as a main component of the monomer, the other monomer component copolymerizable with the alkyl (meth)acrylate (sometimes referred to as "copolymerizable monomer component") may be used. In this regard, the ratio of the alkyl (meth)acrylate to the total amount of the monomer component constituting the acrylic polymer is desirably 80% by weight or more (e.g., 80 to 99.8% by weight), preferably 85% by weight or more (e.g., 85 to 99.5% by weight), more preferably 90 by weight or more (e.g., 90 to 99% by weight).

The copolymerizable monomer component can be used for introducing a crosslinking site into the acrylic polymer or enhancing an aggregating ability of the acrylic polymer. The copolymerizable monomer component may be used solely or in combination of two or more thereof.

Specifically, in order to introduce a crosslinking site into the acrylic polymer, a functional group-containing monomer component, especially a thermally crosslinkable functional group-containing monomer component, can be used as the copolymerizable monomer component. The use of the functional group-containing monomer component can enhance adhesive force toward the adherend. Such a functional group-containing monomer component is not particularly limited as far as it is a monomer component copolymerizable with the alkyl (meth)acrylate and having a functional group which becomes a crosslinking site. Examples thereof include carboxyl group-containing monomers such as (meth)acrylic acid, itaconic acid, crotonic acid, maleic acid, fumaric acid, and isocrotonic acid or acid anhydrides thereof such as maleic anhydride and itaconic anhydride; hydroxyl group-containing monomers, e.g., hydrokyalkyl (meth)acrylates such as 2-hydroxyethyl (meth)acrylate, 2-hydroxypropyl (meth)acrylate, and 2-hydroxybutyl (meth)acrylate and also vinyl alcohol and allyl alcohol; amide-based monomers such as (meth)acrylamide, N,N-dimethyl(meth)acrylamide, N-butyl (meth)acrylamide, N-methylol(meth)acrylamide, N-methylolpropane(meth)-acrylamide, N-methoxymethyl(meth)acrylamide, and N-butoxymethyl(meth)acrylamide; amino group-containing monomers such as aminoethyl (meth)acrylate, N,N-dimethylaminoethyl (meth)acrylate, and t-butylaminoethyl (meth)acrylate; epoxy group-containing monomers such as glycidyl (meth)acrylate and methylglycidyl (meth)acrylate; cyano-containing monomers such as acrylonitrile and methacrylonitrile; monomers having a nitrogen atom-containing ring, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam, and N-(meth)acryloylmorpholine; and the like. As the functional group-containing monomer component, a carboxyl group-containing monomer such as acrylic acid or an acid anhydride thereof can be suitably used.

The amount of the functional group-containing monomer component to be used can be, for example, selected from the range of 12 parts by weight or less, e.g., 0.5 to 12 parts by weight, preferably 1 to 8 parts by weight relative to 100 parts by weight of alkyl (meth)acrylate as a main component of the monomer.

Moreover, as the copolymerizable monomer component, the other copolymerizable monomer component can be used in order to enhance the aggregating ability of the acrylic polymer. Examples of the other copolymerizable monomer component include vinyl ester-based monomers such as vinyl acetate and vinyl propionate; styrene-based monomers such as styrene, substituted styrene (α-methylstyrene, etc.), and vinyltoluene; non-aromatic ring-containing (meth)acrylate esters such as cycloalkyl (meth)acrylates [cyclohexyl (meth)acrylate, cyclopentyl di(meth)acrylate, etc.] and isobornyl (meth)acrylate; aromatic ring-containing (meth)acrylate esters such as aryl (meth)acrylate [phenyl (meth)acrylate, etc.], aryloxyalkyl (meth)acrylate [phenoxyethyl (meth)acrylate, etc.], and arylalkyl (meth)acrylates [benzyl (meth)acrylate]; olefinic monomers such as ethylene, propylene, isoprene, butadiene, and isobutylene; vinyl chloride and vinylidene chloride; isocyanate group-containing monomers such as 2-(meth)acryloyloxyethyl isocyanate; alkoxy group-containing monomers such as methoxyethyl (meth)acrylate and ethoxyethyl (meth)acrylate; vinyl ether-based monomers such as methyl vinyl ether and ethyl vinyl ether; and also polyfunctional monomers such as 1,6-hexanediol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, polypropylene glycol di(meth)acrylate, neopentyl glycol di(meth)acrylate, pentaerythritol di(meth)acrylate, trimethylolpropane tri(meth)acrylate, pentaerythritol tri(meth)acrylate, dipentaerythritol hexa(meth)acrylate, glycerin di(meth)acrylate, epoxy acrylate, polyester acrylate, urethane acrylate, divinylbenzene, butyl di(meth)acrylate, and hexyl di(meth)acrylate; and the like.

As the process for polymerizing the water-dispersion type acrylic polymer, known or conventional polymerization processes can be adopted and an emulsion polymerization process is suitable. At the polymerization, various polymerization processes such as a general all-components-charging process (at once polymerization process), a monomer-dropping process (continuously dropping process, portion-wise dropping process, etc.) can be adopted. The polymerization temperature can be suitably selected according to the kind of the monomer, the kind of an initiator, and the like and can be, for example, selected from the range of 20 to 100° C.

The polymerization initiator to be used at the polymerization can be suitably selected from known or conventional polymerization initiators according to the kind of the polymerization process. Examples of the polymerization initiator include azo polymerization initiators such as 2,2'-azobisisobutyronitrile, 2,2'-azobis(2-methylpropionamidine) disulfate, 2,2'-azobis(2-amidinopropane) dihydrochloride, 2,2'-azobis[2-(5-methyl-2-imidazolin-2-yl)propane] dihydrochloride, 2,2'-azobis(N,N'-dimethyleneisobutylamidine), 2,2'-azobis(4-methoxy-2,4-dimethylvaleronitrile), 2,2'-azobis(2,4-dimethylvaleronitrile), 2,2'-azobis(2-methylbutyro-nitrile), 1,1'-azobis(cyclohexane-1-carbonitrile), 2,2'-azobis(2,4,4-trimethylpentane), and dimethyl-2,2'-azobis(2-methylpropionate); persulfate salts such as potassium persulfate and ammonium persulfate; peroxide-based polymerization initiators such as benzoyl peroxide, t-butyl hydroperoxide, di-t-butyl peroxide, t-butyl peroxybenzoate, dicumyl peroxide, 1,1-bis(t-butylperoxy)-3,3,5-trimethylcyclohexane, 1,1-bis(t-butylperoxy)cyclo-dodecane, and hydrogen peroxide; substituted ethane-based polymerization initiators such as phenyl-substituted ethane; aromatic carbonyl compounds; and redox system initiators by combining peroxides and reducing agents [e.g., redox system initiators, such as combinations of peroxides and ascorbic acid (a combination of a hydrogen peroxide solution and ascorbic acid, and the like combinations), combinations of peroxides and iron(II) salts (a combination of a hydrogen peroxide solution and a iron(II) salt, and the like combinations), combinations of persulfate salts and sodium hydrogen sulfite, and the like combinations]. The polymerization initiator may be used solely or in combination of two or more thereof.

The amount of the polymerization initiator to be used may be a usually used amount and can be, for example, selected from the range of about 0.005 to 1 part by weight relative to 100 parts by weight of the total monomer components.

Moreover, at the polymerization, a chain transfer agent can be used for regulating the molecular weight. As the chain transfer agent, known or conventional chain transfer agents can be used and examples thereof include mercaptans such as dodecanethiol (lauryl mercaptan), glycidyl mercaptane, 2-mercaptoethanol, mercaptoacetic acid, 2-ethylhexyl thioglycolate, and 2,3-dimercapto-1-propanol and also α-methylstyren dimer. The chain transfer agent may be used solely or in combination of two or more thereof. The amount of the chain transfer agent to be used may be a usually used amount and can be, for example, selected from the range of about 0.001 to 0.5 part by weight relative to 100 parts by weight of the total monomer components.

Since the water-dispersion type acrylic polymer is in an emulsion form, the water-dispersion type acrylic polymer may be prepared using a polymer in an emulsion form prepared utilizing an emulsion polymerization process as is or the water-dispersion type acrylic polymer may be prepared by dispersing an acrylic polymer prepared utilizing a polymerization process other than the emulsion polymerization process in water. In this regard, an emulsifier can be used at the emulsion polymerization and at the dispersion of the acrylic polymer in water. The emulsifier may be used solely or in combination of two or more thereof.

Specifically, the emulsifier may be in any forms but anionic emulsifiers or nonionic emulsifiers can be suitably used. Examples of the anionic emulsifier include alkyl sulfate salt-type anionic emulsifiers such as sodium lauryl sulfate, ammonium lauryl sulfate, and potassium lauryl sulfate; polyoxyethylene alkyl ether sulfate salt-type anionic emulsifiers such as sodium polyoxyethylene lauryl ether sulfate; polyoxyethylene alkylphenyl ether sulfate salt-type anionic emulsifiers such as ammonium polyoxyethylene laurylphenyl ether sulfate and sodium polyoxyethylene laurylphenyl ether sulfate; sulfonate salt-type anionic emulsifiers such as sodium dodecylbenzenesulfonate; sulfosuccinate-type anionic emulsifiers such as disodium laurylsulfosuccinate and disodium lauryl polyoxyethylenesulfosuccinate; and the like. Moreover, examples of the nonionic emulsifier include polyoxyethylene alkyl ether-type nonionic emulsifiers such as polyoxyethylene lauryl ether; polyoxyethylene alkylphenyl ether-type nonionic emulsifiers such as polyoxyethylene laurylphenyl ether; nonionic emulsifiers such as polyoxyethylene fatty acid esters, polyoxyethylene-polyoxypropylene block polymers; and the like.

The amount of the emulsifier to be used is not particularly limited as far as it is an amount capable of preparing the acrylic polymer in an emulsion form. For example, the amount can be selected from the range of about 0.2 to 10% by weight, preferably about 0.5 to 5% by weight based on the total amount of the acrylic polymer or monomer components.

In the tackifying resin-containing emulsion, the amount of the tackifying resin to be used is not particularly limited and can be suitably set according to impartment of aimed pressure-sensitive adhesive force and impartment of terminal peeling resistance. As the tackifying resin-containing emulsion, the tackifying resin in the tackifying resin-containing emulsion is desirably used in a ratio of 10 to 100 parts by weight, preferably 15 to 80 parts by weight, more preferably 20 to 60 parts by weight relative to 100 parts by weight of the acrylic polymers in the water-dispersion type acrylic polymer. When the tackifying resin-containing emulsion is mixed in such an amount that the tackifying resin in the tackifying resin-containing emulsion amounts to less than 10 parts by weight based on 100 parts by weight of the acrylic polymer in the water-dispersion type acrylic polymer, an addition effect of the tackifying resin is not sufficient and aimed pressure-sensitive adhesive force cannot be obtained as well as terminal peeling resistance is lowered. On the other hand, when it is mixed in an amount exceeding 100 parts by weight, a remaining amount of the organic solvent increases and a pressure-sensitive adhesive force is lowered due to poor compatibility with the acrylic polymer.

(Other Components)

In the water-dispersion type acrylic pressure-sensitive adhesive for forming the tackifying resin-containing pressure-sensitive adhesive layer, a crosslinking agent may be used, if necessary. The crosslinking agent is not particularly limited and can be suitably selected from among known or conventional crosslinking agents, e.g., isocyanate-based crosslinking agents, epoxy-based crosslinking agents, oxazoline-based crosslinking agents, aziridine-based crosslinking agents, melamine-based crosslinking agents, peroxide-based crosslinking agents, urea-based crosslinking agents, metal alkoxide-based crosslinking agents, metal chelete-based crosslinking agents, metal salt-based crosslinking agents, carbodiimide-based crosslinking agents, amine-based crosslinking agents, etc. In this regard, the crosslinking agent may be any of oil-soluble crosslinking agents and water-soluble crosslinking agents. The crosslinking agent may be used solely or in combination of two or more thereof. The amount of the crosslinking agent to be used is not particularly limited and, for example, the amount can be selected from the range of not more than about 10 parts by weight, for example, 0.005 to 10% by weight, preferably 0.01 to 5% by weight based on 100 parts by weight of the acrylic polymer in the water-dispersion type acrylic polymer.

Moreover, the water-dispersion type acrylic pressure-sensitive adhesive for forming the tackifying resin-containing pressure-sensitive adhesive layer may contains the other additives, e.g., an antiaging agent, a UV absorber, an antioxidant, a light stabilizer, a peeling regulator, a plasticizer, a softening agent, a filler, a colorant (pigment, dye, etc.), a surfactant, an antistatic agent, and the like, as well as may contain a base (ammonia water, etc.) or an acid for adjusting the pH.

The tackifying resin-containing pressure-sensitive adhesive layer can be formed by applying, on a predetermined surface, a water-dispersion type acrylic pressure-sensitive adhesive prepared by mixing or kneading the above components (a water-dispersion type acrylic polymer, a tackifying resin-containing emulsion, and also, if necessary, a crosslinking agent and various additives) in predetermined amounts, followed by drying or curing. At the application of the water-dispersion type acrylic pressure-sensitive adhesive, a conventional coater, e.g., a gravure roll coater, a reverse roll coater, a kiss roll coater, a dip roll coater, a bar coater, a knife coater, a spray coater, or the like, can be employed.

The thickness of the tackifying resin-containing pressure-sensitive adhesive layer can be suitably selected from the range of 2 to 150 µm, preferably 5 to 100 µm but, in particular, the range of 2 to 50 µm, particularly 2 to 20 µm, is preferred.

[Support]

In the pressure-sensitive adhesive sheet of the invention, as a support, a substrate or a release liner can be suitably used. As mentioned above, when the support is a substrate, the pressure-sensitive adhesive sheet is a substrate-attached pressure-sensitive adhesive sheet. When the support is not a substrate but a release liner, the pressure-sensitive adhesive sheet is a substrate-less pressure-sensitive adhesive sheet. Therefore, the release liner in the substrate-attached pressure-sensitive adhesive sheet [e.g., release liners 4 in FIGS. 1A to 1C] is not included in the support but the release liner in the substrate-less pressure-sensitive adhesive sheet [e.g., release liners 4 in FIGS. 1E and 1F, etc.] is included in the support. Thus, the release liner as the support supports a laminate of the tackifying resin-containing pressure-sensitive adhesive layer and also can protect the surface of the tackifying resin-containing pressure-sensitive adhesive layer.

In the support, example of the substrate include plastic sheets or films such as sheets or film made of polyolefins (sheets or film made of polyethylene, sheets or film made of polypropylene, sheets or film made of ethylene-propylene copolymers, etc.), sheets or film made of polyesters (sheets or film made of polyethylene terephthalate, etc.), sheets or film made of vinyl chloride-based resins, sheets or film made of vinyl acetate-based resins, sheets or film made of polyimide-based resins, sheets or film made of polyamide-based resins, sheets or film made of fluorocarbon resins, and cellophanes; papers such as Japanese papers, kraft paper, glassine paper, wood free paper, synthetic paper, top coat paper, etc.; fabrics of single or blended woven fabrics and nonwoven fabrics composed of natural fibers, semi-synthetic fibers, and synthetic fibers, such as cotton fiber, staple fiber, Manila fiber, pulp, rayon, acetate fiber, polyester fiber, polyvinyl alcohol fiber, polyamide fiber, and polyolefin fiber; rubber sheets composed of natural rubber, butyl-rubber, etc.; foam sheets made of foams composed of polyurethane, polychloroprene rubber, etc.; metal foils such as aluminum foil, copper foil, etc.; and composites thereof. The above plastic sheets or films may be any of non-stretched types or stretched types (uniaxially stretched types or biaxially stretched types). The substrate may be in a single layer form or may be in a laminated form.

Incidentally, the substrate may be mixed with various additives such as a filler (inorganic filler, organic filler, etc.), an antiaging agent, an atioxidant, a UV absorber, a lubricant, a plasticizer, and a colorant (pigment, dye, etc.).

The surface of the substrate (especially, surface at the polymer layer side) may be subjected to suitable a known or conventional surface treatment, e.g., a physical treatment such as a corona discharge treatment or a plasma treatment, a chemical treatment such as an under coat treatment or a backside treatment, or the like.

The thickness of the substrate can be suitably selected according to the purpose but, in general, is from about 10 to 200 µm, preferably from about 20 to 100 µm.

(Release Liner)

In the support, the release liner is not particularly limited and can be suitably selected from among known release liners. As the release liner, a substrate having a release treatment layer with a release treatment agent at least one surface can be suitably used. In addition, low-adhesive substrates composed of fluorocarbon polymers (e.g., polytetrafluoroethylene, polychlorotrifluoro-ethylene, polyvinyl fluoride, polyvinylidene fluoride, a tetrafluoroetylene-hexafluoropropylene copolymer, a chlorofluoroethylene-vinylidene fluoride copolymer, etc.) and low-adhesive substrates composed of non-polar polymers (e.g., olefin-based resins such as polyethylene and polypropylene) can be also employed.

As the substrate of the release liner, plastic sheets or films are suitably used but papers, fabrics, rubber sheets, foam sheets, metal foils, and the like exemplified as the substrates for the support can be also used. The plastic sheets and films for the substrate of the above release liner are not particularly limited and can be, for example, suitably selected from the plastic sheets and films exemplified as the substrates for the support.

Moreover, as the release treatment agent for forming the release treatment layer, known or conventional release treatment agents (silicone-based release treatment agents, fluorine-based release treatment agents, long-chain alkyl-based release treatment agents, etc.) can be used.

The thickness of the substrate or the release treatment layer in the release liner is not particularly limited and can be suitably selected according to the purpose. For example, the total thickness of the release liner is preferably 15 µm or more, more preferably from 25 to 500 µm.

Incidentally, the release liner in the substrate-less pressure-sensitive adhesive sheet can be suitably selected from the release liners exemplified as the release liner as a support. The release liner which protects the surface of the tackifying resin-containing pressure-sensitive adhesive layer and the release liner as a support may have the same constitution or may have different constitutions.

[Pressure-Sensitive Adhesive Sheet]

In the invention, the pressure-sensitive adhesive sheet means a sheet-shape pressure-sensitive adhesive article having or capable of having a form of sheet-shape article having a pressure-sensitive adhesive layer. Specifically, the pressure-sensitive adhesive sheet includes a pressure-sensitive adhesive tape, a pressure-sensitive adhesive sheet, a pressure-sensitive adhesive film, a pressure-sensitive adhesive label, or the like.

As far as the above pressure-sensitive adhesive sheet has the tackifying resin-containing pressure-sensitive adhesive layer, the sheet may have other layers (e.g., an intermediate layer, an under coat layer, etc.) within the range where the advantages of the invention are not impaired.

Such a pressure-sensitive adhesive sheet can be produced in accordance with the process for producing usual pressure-sensitive adhesive tapes and pressure-sensitive adhesive sheets depending on the kind of the pressure-sensitive adhesive sheet. Specifically, in the case that the pressure-sensitive adhesive sheet is a substrate-attached type, the substrate-attached type pressure-sensitive adhesive sheet can be, for example, prepared by (1) a preparation method comprising applying a water-dispersion type acrylic pressure-sensitive adhesive containing a water-dispersion type acrylic polymer and a tackifying resin-containing emulsion on at least one surface (one side or both sides) of a substrate so that the thickness after drying becomes a predetermined thickness and subsequently drying the pressure-sensitive adhesive to form a tackifying resin-containing pressure-sensitive adhesive layer or (2) a preparation method comprising applying, on a separator, a water-dispersion type acrylic pressure-sensitive adhesive containing a water-dispersion type acrylic polymer and a tackifying resin-containing emulsion so that the thickness after drying becomes a predetermined thickness, drying the pressure-sensitive adhesive to form a tackifying resin-containing pressure-sensitive adhesive layer, and subsequently transferring the tackifying resin-containing pressure-sensitive adhesive layer onto at least one surface (one side or both sides) of a substrate.

On the other hand, the pressure-sensitive adhesive sheet is a substrate-less type, the substrate-less type pressure-sensitive adhesive sheet can be, for example, prepared by (1) a preparation method comprising applying a water-dispersion type acrylic pressure-sensitive adhesive containing a water-dispersion type acrylic polymer and a tackifying resin-containing emulsion on at least one release surface (surface of release treatment layer, surface of low-adhesive substrate, etc.) of a release liner so that the thickness after drying becomes a predetermined thickness and subsequently drying the pressure-sensitive adhesive to form a tackifying resin-containing pressure-sensitive adhesive layer.

Figure 1F:
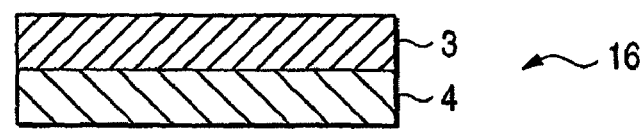

Incidentally, the pressure-sensitive adhesive sheets shown in FIGS. 1B, 1D, and 1F can be wound into a roll with overlaying the pressure-sensitive adhesive surface at one side of the pressure-sensitive adhesive sheet (surface of the tackifying resin-containing pressure-sensitive adhesive layer) on the release surface at another side (surface of the backside treated layer of the substrate, surface of the release treatment layer of the release liner, etc.) to prepare pressure-sensitive adhesive sheets in a form wound into a roll.

Moreover, when crosslinking is conducted at the formation of the tackifying resin-containing pressure-sensitive adhesive layer, the crosslinking can be achieved through a predetermined production step by a known or conventional crosslinking method depending on the kind of a crosslinking agent (e.g., a heat-crosslinkable type crosslinking agent which achieves crosslinking by heating, a photo-crosslinkable crosslinking agent which achieves crosslinking by UV irradiation, or the like). For example, when the crosslinking agent used is a heat-crosslinkable type crosslinking agent, crosslinking can be achieved at the time when the water-dispersion type acrylic pressure-sensitive adhesive is dried after its application in parallel with or simultaneous with the drying by allowing a thermal crosslinking reaction to proceed. Specifically, depending on the kind of the heat-crosslinkable type crosslinking agent, crosslinking can be achieved together with drying by heating to a temperature higher than the temperature at which the crosslinking reaction proceeds.

In the invention, at the drying of the water-dispersion type acrylic pressure-sensitive adhesive layer after its application, it is suitable to intensify the drying as far as possible. When the drying is intensified, organic solvents such as formaldehyde and toluene, which remain in the pressure-sensitive adhesive sheet or the tackifying resin-containing pressure-sensitive adhesive layer, can be further diminished and thus a pressure-sensitive adhesive sheet having further reduced diffusing amounts of organic solvents such as formaldehyde and toluene can be obtained.

When the tackifying resin-containing pressure-sensitive adhesive layer is formed by crosslinking, the ratio of solvent-insoluble matter (crosslinked product of the acrylic polymer) in the tackifying resin-containing pressure-sensitive adhesive layer is not particularly limited but is desirably from about 15 to 70% by weight based on the total amount of the solid matter in the tackifying resin-containing pressure-sensitive adhesive layer. Moreover, in this case, the acrylic polymer as solvent-soluble matter in the tackifying resin-containing pressure-sensitive adhesive layer desirably has a weight average molecular weight (in terms of polystyrene, analytical apparatus: "HLC-8120GPC" manufactured by TOSOH Corporation, column: "TSKgel GMH-H(S)") of 100,000 to 600,000, preferably 200,000 to 450,000.

Incidentally, the ratio of the crosslinked product of the acrylic polymer as solvent-insoluble matter after crosslinking and the molecular weight (weight average molecular weight) of the acrylic polymer as solvent-soluble matter can be freely set by suitably adjusting the ratio of the functional group-containing monomer to the total amount of the monomer components, the kind and ratio of the chain transfer agent, the kind and ratio of the crosslinking agent, and the like.

Since the pressure-sensitive adhesive sheet of the invention has a high adhesiveness and an excellent terminal peeling resistance as well as exhibits extremely small diffusing amounts of formaldehyde and toluene, influence on human bodies can be reduced even when it is utilized in the applications in closed spaces, such as materials for automobiles (e.g., interior materials for automobiles) and materials for residential buildings (e.g., house building materials). Therefore, the pressure-sensitive adhesive sheet of the invention can be suitably used at the time when a material for automobiles or a material for residential buildings is to be fixed.

The following will explain the invention more specifically with reference to Examples. In the following, "part(s)" means "part(s) by weight" and "%" means "% by weight".

EXAMPLE 1

Using a reaction vessel fitted with a condenser tube, a nitrogen-inlet tube, a thermometer, and stirrer, parts of butyl acrylate, 10 parts of 2-ethylhexyl acrylate, 4 parts of acrylic acid, 0.05 part of dodecanethiol (chain transfer agent), and 0.1 part of 2,2'-azobis[2-(5-methyl-2-imidazolin-2-yl)propane]dihydrochloride (polymerization initiator) were added to 100 parts of water to which 2 parts of sodium polyoxyethylene lauryl sulfate (emulsifier) had been added, whereby they were charged into the above reaction vessel. Under stirring, the whole was heated to 60° C. and an emulsion polymerization reaction was carried out at 60° C. for 4 hours. Then, aging was conducted for 2 hours to obtain a reaction mixture containing an acrylic polymer.

To the reaction mixture was added 10% ammonia water to adjust the pH to 7. Subsequently, 0.7 part of a water-soluble oxazoline-based crosslinking agent (oxazoline-type crosslinking agent) (trade name "Epocross WS-500" manufactured by Nippon Shokubai Co., Ltd.) dissolved in water was added thereto to obtain a water dispersion of acrylic polymer (water-dispersion type acrylic polymer).

To the water-dispersion type acrylic polymer was added 30 parts of a trade name "SK-253NS" (manufactured by Harima Chemicals, Inc.; softening point 145° C.; polymerized rosin-based resin) as an emulsion containing a tackifying resin relative to 100 parts (solid matter) of the water-dispersion type acrylic polymer in terms of solid matter, whereby a water-dispersion type pressure-sensitive adhesive containing a tackifying resin (water-dispersion type acrylic pressure-sensitive adhesive) was obtained. In this regard, the trade name "SK-253NS" is an emulsion containing a tackifying resin produced using substantially no organic solvent.

The water-dispersion type acrylic pressure-sensitive adhesive was applied on the surface of the release treatment layer of a release liner (trade name "SLB-80WD(V2)" manufactured by Kaito Chemical Industry Co., Ltd.) having a release treatment layer treated with a silicone-based release agent, followed by 2 minutes of drying at 100° C. to form a pressure-sensitive adhesive layer (tackifying resin-containing pressure-sensitive adhesive layer) having a thickness of 60 μm. The tackifying resin-containing pressure-sensitive adhesive layer is adhered to both sides of a nonwoven fabric-made substrate (trade name "SP base paper-14" manufactured by Daifuku Paper M.F.G. Co., Ltd.) to prepare a pressure-sensitive adhesive sheet (double-sided pressure-sensitive adhesive sheet).

EXAMPLE 2

A pressure-sensitive adhesive sheet (double-sided pressure-sensitive adhesive sheet) was prepared in the same manner as in Example 1 except that 30 parts of a trade name "Tamanor E-200-NT" (manufactured by Arakawa Chemical Industries, Ltd.; softening point 150° C.; rosin-phenol-based resin) as an emulsion containing a tackifying resin relative was used relative to 100 parts (solid matter) of the water-dispersion type acrylic polymer in terms of solid matter. In this regard, the trade name "Tamanor E-200-NT" is an emulsion containing a tackifying resin produced using an alicyclic hydrocarbon-based organic solvent.

EXAMPLE 3

Using a reaction vessel fitted with a condenser tube, a nitrogen-inlet tube, a thermometer, and stirrer, 90 parts of butyl acrylate, 10 parts of 2-ethylhexyl acrylate, 4 parts of acrylic acid, 0.05 part of dodecanethiol (chain transfer agent), 0.1 part of 2,2'-azobis[2-(5-methyl-2-imidazolin-2-yl)propane]dihydrochloride (polymerization initiator), and 0.06 part of 3-methacryloyloxypropyltriethoxysilane (trade name "KBM-503" manufactured by Sin-Etsu Silicone K.K.) were added to 100 parts of water to which 2 parts of sodium polyoxyethylene lauryl sulfate (emulsifier) had been added, whereby they were charged into the above reaction vessel. Under stirring, the whole was heated to 60° C. and an emulsion polymerization reaction was carried out at 60° C. for 4 hours. Then, aging was conducted for 2 hours to obtain a reaction mixture containing an acrylic polymer.

To the reaction mixture was added 10% ammonia water to adjust the pH to 7, whereby a water dispersion of acrylic polymer (water-dispersion type acrylic polymer) was obtained.

To the water-dispersion type acrylic polymer was added 30 parts of a trade name "SK-253NS" (manufactured by Harima Chemicals, Inc.; softening point 145° C.; polymerized rosin-based resin) as an emulsion containing a tackifying resin relative to 100 parts (solid matter) of the water-dispersion type acrylic polymer in terms of solid matter, whereby a water-dispersion type pressure-sensitive adhesive (water-dispersion type acrylic pressure-sensitive adhesive) was obtained.

The water-dispersion type acrylic pressure-sensitive adhesive was applied on the surface of the release treatment layer of a release liner (trade name "SLB-80WD(V2)" manufactured by Kaito Chemical Industry Co., Ltd.) having a release treatment layer with a silicone-based release agent, followed by 2 minutes of drying at 100° C. to form a pressure-sensitive adhesive layer (tackifying resin-containing pressure-sensitive adhesive layer) having a thickness of 60 µm. The tackifying resin-containing pressure-sensitive adhesive layer is adhered to both sides of a nonwoven fabric-made substrate (trade name "SP base paper-14" manufactured by Daifuku Paper M.F.G. Co., Ltd.) to prepare a pressure-sensitive adhesive sheet (double-sided pressure-sensitive adhesive sheet).

EXAMPLE 4

A water-dispersion type acrylic pressure-sensitive adhesive was prepared in the same manner as in Example 1. The water-dispersion type acrylic pressure-sensitive adhesive was applied on the surface of the release treatment layer of a release liner (trade name "SLB-80WD(V2)" manufactured by Kaito Chemical Industry Co., Ltd.) having a release treatment layer treated with a silicone-based release agent, followed by 2 minutes of drying at 100° C. to form a pressure-sensitive adhesive layer (tackifying resin-containing pressure-sensitive adhesive layer) having a thickness of 60 µm, whereby a pressure-sensitive adhesive sheet (double-sided pressure-sensitive adhesive sheet) was made.

COMPARATIVE EXAMPLE 1

A water-dispersion type acrylic polymer was prepared in the same manner as in Example 1. The water-dispersion type acrylic polymer was applied on the surface of the release treatment layer of a release liner (trade name "SLB-80WD (V2)" manufactured by Kaito Chemical Industry Co., Ltd.) having a release treatment layer with a silicone-based release agent, followed by 2 minutes of drying at 100° C. to form a pressure-sensitive adhesive layer (pressure-sensitive adhesive layer containing no tackifying resin) having a thickness of 60 µm. The pressure-sensitive adhesive layer containing no tackifying resin is adhered to both sides of a nonwoven fabric-made substrate (trade name "SP base paper-14" manufactured by Daifuku Paper M.F.G. Co., Ltd.) to prepare a pressure-sensitive adhesive sheet (double-sided pressure-sensitive adhesive sheet). Therefore, the pressure-sensitive adhesive layer in the pressure-sensitive sheet contained no tackifying resin-containing emulsion.

COMPARATIVE EXAMPLE 2

A pressure-sensitive adhesive sheet (double-sided pressure-sensitive adhesive sheet) was prepared in the same manner as in Example 1 except that 30 parts of a trade name "Tamanor E-200" (manufactured by Arakawa Chemical Industries, Ltd.; softening point 150° C.; rosin phenol-based resin) as an emulsion containing a tackifying resin was used relative to 100 parts (solid matter) of the water-dispersion type acrylic polymer in terms of solid matter. In this regard, the trade name "Tamanor E-200" is an emulsion containing a tackifying resin produced using an aromatic hydrocarbon-based organic solvent.

(Evaluation)

With regard to each pressure-sensitive adhesive sheet obtained in Examples and Comparative Example, a diffusing amount of formaldehyde, a diffusing amount of toluene, a pressure-sensitive adhesive force, and a terminal peeling resistance were measured or evaluated by the following methods. The results are shown in Table 1.

(Measuring method of diffusing amount of formaldehyde)

The amount was measured by the method in accordance with JIS A 1901 (2003). In this regard, the surface area of the sample measured was 0.043 m$^2$ and a content (µg/m$^3$) of formaldehyde per unit volume of the pressure-sensitive adhesive sheet was calculated and quantitatively determined.

(Measuring Method of Diffusing Amount of Toluene)

A sample was prepared by cutting each pressure-sensitive adhesive sheet into a predetermined size (area: 5 cm$^2$) and the sample was placed in a vial, which was then tightly sealed. Then, the vial in which the sample had been placed was heated to 150° C. for 30 minutes by a head space auto-sampler to inject 1.0 ml of gas in a heated state into a gas chromatograph measuring apparatus, whereby an amount of toluene was measured and a content (µg/g) of toluene per unit weight of the pressure-sensitive adhesive sheet was calculated and quantitatively determined.

(Measuring Method of Pressure-Sensitive Adhesive Force)

Each pressure-sensitive adhesive sheet was attached under pressure by a method wherein a 2 kg roller was once reciprocated on a stainless (SUS) plate. After standing at 23° C. for 20 minutes, a 180°-peel pressure-sensitive adhesive force (23° C., 50% RH; N/20 mm) was measured.

(Evaluation Method of Terminal Peeling Resistance)

Each pressure-sensitive adhesive sheet was adhered to an aluminum plate having a thickness of 0.5 mm (area: 10 mm×100 mm) and then the release liner was peeled off to expose another pressure-sensitive adhesive surface. The exposed pressure-sensitive adhesive surface was adhered to the lateral surface of a cylindrical acrylic round-bar having a diameter of 50 mm. It was allowed to stand under an atmosphere of 70° C. for 2 hours in a state that the round-bar was placed vertically and a peeled distance (height) (mm) of the terminal part of the aluminum plate at that time was measured.

TABLE 1

| | Formaldehyde-diffusing amount of (µg/m$^3$) | Toluene-diffusing amount (µg/g) | 180°-peel pressure-sensitive adhesive force (N/20 mm) | Peeled distance of terminal part (mm) |
|---|---|---|---|---|
| Example 1 | less than 3 | 3 | 13 | 3 |
| Example 2 | less than 3 | 5 | 14 | 2 |
| Example 3 | less than 3 | 3 | 14 | 1 |
| Example 4 | less than 3 | 2 | 11 | 3 |
| Comparative Example 1 | less than 3 | 3 | 7 | 7 |
| Comparative Example 2 | less than 3 | 160 | 14 | 2 |

From Table 1, the pressure-sensitive adhesive sheets according to Examples 1 to 4 were designed to have extremely small diffusing amounts of formaldehyde and toluene with maintaining good terminal peeling resistance and pressure-sensitive adhesive force. Accordingly, it was confirmed that pressure-sensitive adhesive sheets having a high safety were obtained.

While the invention has been described in detail and with reference to specific embodiments thereof, it will be apparent to one skilled in the art that various changes and modifications can be made therein without departing from the spirit and scope thereof.

What is claimed is:

1. A water-dispersion acrylic pressure-sensitive adhesive, comprising:
    a water-dispersion acrylic polymer containing butyl acrylate and 2-ethylhexyl acrylate, and
    a tackifying resin-containing emulsion prepared using substantially no organic solvent,
    wherein a ratio of the butyl acrylate and the 2-ethylhexyl acrylate to the total amount of monomer components constituting the acrylic polymer is 90% by weight or more,
    a ratio of the 2-ethylhexyl acrylate to the butyl acrylate is 5/95 to 60/40, and
    wherein the tackifying resin is selected from the group consisting of a rosin-based tackifying resin, a terpene-based tackifying resin and a phenol-based tackifying resin.

2. The water-dispersion acrylic pressure-sensitive adhesive according to claim 1, wherein the tackifying resin has a softening point of 120° C. or higher.

3. The water-dispersion acrylic pressure-sensitive adhesive according to claim 1, wherein the tackifying resin is produced by using no formaldehyde.

4. The water-dispersion acrylic pressure-sensitive adhesive according to claim 1, wherein the tackifying resin-containing emulsion is prepared by dissolving or melting a tackifying resin.

5. The water-dispersion acrylic pressure-sensitive adhesive according to claim 1, wherein the water-dispersion acrylic polymer further contains a copolymerizable monomer.

6. The water-dispersion acrylic pressure-sensitive adhesive according to claim 5, wherein the copolymerizable monomer is a thermally crosslinkable functional group-containing monomer.

7. The water-dispersion acrylic pressure-sensitive adhesive according to claim 6, wherein the amount of the functional group-containing monomer is in the range 12 parts by weight or less to 100 parts by weight of the acrylic monomer.

8. The water-dispersion acrylic pressure-sensitive adhesive according to claim 1, wherein the tackifying resin in the tackifying resin-containing emulsion is present in a ratio of 10 to 100 parts by weight to 100 parts by weight of the acrylic polymer in the water-dispersion type acrylic polymer.

9. The water-dispersion acrylic pressure-sensitive adhesive according to claim 1, further comprising at least a crosslinking agent, an anti-aging agent, a UV absorber, an antioxidant, a light stabilizer, a peeling regulator, a plasticizer, a softening agent, a filler, a colorant, a surfactant, an antistatic agent, or a pH adjuster.

* * * * *